May 1, 1923.

E. L. POWELL ET AL 1,453,724

GRID LEAK

Filed June 26, 1922

Inventors
Edwin L. Powell
Charles E. Motto
By John B. Brady
Attorney

Patented May 1, 1923.

1,453,724

UNITED STATES PATENT OFFICE.

EDWIN L. POWELL AND CHARLES E. MOTTO, OF WASHINGTON, DISTRICT OF COLUMBIA.

GRID LEAK.

Application filed June 26, 1922. Serial No. 570,941.

*To all whom it may concern:*

Be it known that we, EDWIN L. POWELL and CHARLES E. MOTTO, citizens of the United States, residing at Washington, District of Columbia, have invented certain new and useful Improvements in Grid Leaks, of which the following is a specification.

Our invention relates to thermionic electron tube apparatus and more particularly to grid leaks for use in the circuits of such apparatus. The object of our invention is to provide a construction of grid leak having permanent characteristics and not subject to change by variation of normal conditions.

A further object of the invention is to provide a grid leak of simplified construction capable of quantity manufacture rapidly and at small cost.

A further object of the invention is to provide a grid leak which is hermetically sealed against all moisture or outside atmosphere, the electrical terminals for the leak path being provided through the hermetic seals which are also employed for supporting the resistance element of the leak.

A still further object of the invention is the provision of a grid leak of tubular form with fusible alloy ends, the alloy being selected for its low melting point and properties of expansion upon cooling.

The invention also contemplates the use of a resistance member for a grid leak constructed with precision and accuracy in its resistance characteristics.

We are aware of previous construction of grid leaks, among which a grid leak having a very thin film of tantalum deposited along the inner wall of a glass tube may be mentioned. In this form of grid leak as well as in other forms of grid leaks many manufacturing difficulties are involved which are overcome by our present invention.

Figure 1:
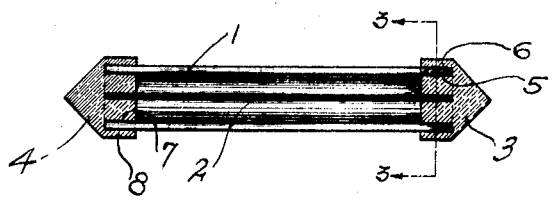
Figure 2:
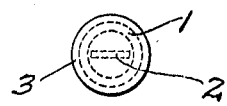
Figure 3:
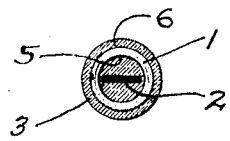
Figure 4:
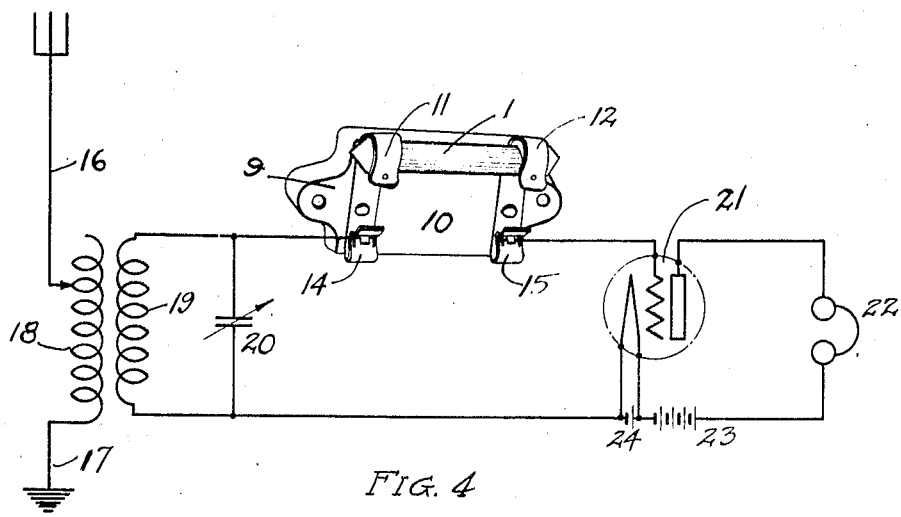

Our invention will be more clearly understood from the following specification with reference to the accompanying drawings in which:

Fig. 1 is a half sectional view through the length of our grid leak; Fig. 2 is an end view of the grid leak; Fig. 3 is a cross sectional view of the grid leak taken on line 3—3 of Fig. 1; and Fig. 4 is a diagrammatic layout of a radio receiving circuit illustrating the connection of the grid leak in the thermionic electron tube circuit.

It will be understood that the principles of our invention may be embodied in various forms and that details are not material. The present embodiment of the invention, therefore, is to be considered as merely indicative. The form illustrated in the drawing and hereinafter described in detail has been found to be one of the practical embodiments and capable of efficient operation and practical in construction.

The grid leak comprises an insulated tubular member containing the resistance element. The resistance element is made up of a strip of paper coated with carbonaceous material to support the coating of graphite which is placed upon the strip while the strip is connected in an arm of a Wheatstone bridge circuit. By use of the Wheatstone bridge an accurate order of resistance of the leak path is secured. This resistance is made in orders varying from one half to three or four megohms. This resistance element is supported within the grid leak casing and hermetically sealed against the atmosphere by end members of a fusible metallic alloy. We choose such an alloy as is characterized by a low melting point and its ability to expand on cooling. The metallic alloy in each end of the grid leak functions to mechanically support the leak resistance, to hermetically seal the leak against the atmosphere, and to provide terminals for the electrical connection of the leak path in the electron tube circuit. The value of the resistance of the leak path is carefully measured by Wheatstone bridge again after the grid leak is hermetically sealed to insure the accuracy of the initial measurement. The relatively good conductivity of the metallic alloy employed has negligible resistance as compared to the value of resistance in the leak path.

Referring now more particularly to the drawings, the grid leak comprises an insulated tubular member 1 which may be of glass or other material. Contained within the tubular member we provide the grid leak resistance element 2. This element is formed from a paper strip coated with carbonaceous material such as black drawing ink and a graphitic coating is placed upon the strip to obtain the desired resistivity, as heretofore mentioned. The ends of the resistance element 2 are supported in the fusible metal alloy members 3 and 4. The alloy may comprise a composition of tin, lead, bismuth and cadmium, forming alloys having melting points as low as 140 to 158 degrees Fahrenheit. These alloys have compositions of the above elements in parts by weight ranging approximately, tin 4, lead 8, bismuth 15, and cadmium 3 to 4. These proportions vary in a great many instances and we intend no limitation upon the specific proportion of the elements in our composition. Of these alloys we refer particularly to Wood's metal and Lipowitz's metal. These alloys have the characteristics of good electrical conductivity, low melting point, and the fact that they expand on cooling. We make use of these characteristics in that the fusible metal plugs 3 and 4 mechanically support the resistance element and form electrical terminals for the ends thereof. The temperature in the alloy plug members 3 and 4 is so low that no undue heating is imparted to the grid leak casing 1 and on cooling the members 3 and 4 expand and grip the walls of the tube at 5—6 and 7—8 forming a secure mechanical connection. The alloy plug members 3 and 4 may be formed at the extremities with conical ends to permit the grid leak to be inserted in a spring support or, as shown in Fig. 4, the grid leak may be connected across the grid condenser 10 in casing 9 by springing the alloy ends of the grid leak 1 into spring clips 11 and 12. The terminals for the grid condenser with grid leak shunted there-across are indicated at 14 and 15. The circuit diagram illustrated in Fig. 4 is merely illustrative of one form of connections which may be employed. In this diagram 16 and 17 represent an antenna ground system for a radio receiving apparatus. 18 indicates a primary inductance in the antenna ground circuit. Secondary inductance 19 is inductively associated with the primary inductance 18 and the circuit is brought to resonance by tuning condenser 20. The electron tube detector 21 has the grid leak and grid condenser in series with its grid circuit. Telephone receivers 22 are represented in the plate circuit of the thermionic electron tube in series with B battery 23. The filament circuit contains filament heating battery 24.

In one method of assembling the grid leak the fusible alloy plugs are formed substantially flush with the ends of the tube and hermetically seal the same. The electrically conductive fusible metal ends are moulded around the surface of the plugs and to the exterior walls of the tube. The property of low melting point of the alloy permits the two portions of the plug to seal together and form the hermetic closure for the tube.

While we have described our invention in a specific embodiment we intend no limitations other than those imposed by the scope of the appended claims.

What we claim is:

1. A grid leak comprising a resistance element, means enclosing said element, and moulder members adhering to both the inside and outside of said enclosing means and supporting said element within said enclosing means.

2. A grid leak comprising a glass tube, a paper strip therein, a carbonaceous graphitic surface on said strip, a fusible metallic alloy in each end of said tube mechanically supporting said strip and providing electrical terminals for exterior connections.

3. A grid leak comprising a high resistance conductor, an insulated tubular container enclosing said conductor, and an alloy containing tin, lead, bismuth and cadmium supporting said conductor in the ends of said tube.

4. A grid leak comprising a high resistance element, an insulated container for said element, and means expanded against the walls of said container supporting said element at spaced intervals in said container.

5. A grid leak comprising a high resistance element, an insulated container for said element, means expanded against the walls of said container supporting said element at spaced intervals, and means integral with said first named means forming electrical terminals for said high resistance element.

6. A grid leak comprising a high resistance element, an insulated tubular container for said member, fusible metal hermetic seals securing said element in said tubular container and forming terminals for electrical connections.

7. A grid leak comprising a resistance element, a glass tube and a pair of fusible metal plugs secured in the ends of said tube and connecting said resistance element.

8. A grid leak comprising a resistance element, a glass tube, and a pair of conical fusible metal plugs secured in the ends of said tube and connecting said resistance element.

9. A grid leak comprising a resistance element, a glass tube, and metallic hermetic seals secured in the ends of said tube and connecting said resistance element.

10. A grid leak comprising a resistance element, a glass tube, and a pair of expanded metal plugs secured in the ends of said tube and connecting said resistance element.

11. A grid leak comprising a paper strip, a carbonaceous surface thereon, a glass tube, hermetic seals in the ends of said tube electrically connected with the ends of said strip and means integral with said hermetic seals for completing connections exterior to said tube.

12. A grid leak comprising a paper strip, a carbonaceous surface thereon, a glass tube, hermetic seals in the ends of said tube electrically connected with the ends of said strip, and a fusible alloy integral with said hermetic seals for completing connections exterior to said tube.

EDWIN L. POWELL.
CHARLES E. MOTTO.